United States Patent
Yen (10) Patent No.: US 8,274,268 B2
(45) Date of Patent: Sep. 25, 2012

(54) SWITCHING VOLTAGE REGULATOR, CONTROL CIRCUIT AND METHOD THEREOF

(75) Inventor: Chih Yueh Yen, Hsinchu (TW)

(73) Assignee: Advanced Analog Technology, Inc., Science-Based Industrial Park, Hsinchu (TW)

( * ) Notice: Subject to any disclaimer, the term of this patent is extended or adjusted under 35 U.S.C. 154(b) by 1078 days.

(21) Appl. No.: 12/190,809

(22) Filed: Aug. 13, 2008

(65) Prior Publication Data
US 2009/0184701 A1 Jul. 23, 2009

(30) Foreign Application Priority Data
Jan. 18, 2008 (TW) ............... 97101900 A (51) Int. Cl.
*G05F 1/00* (2006.01)

(52) U.S. Cl. ..................... 323/282; 323/283

(58) Field of Classification Search ........... 323/271, 323/282, 283, 284, 285
See application file for complete search history.

(56) References Cited

U.S. PATENT DOCUMENTS

| 6,396,252 | B1 * | 5/2002 | Culpepper et al. ......... 323/285 |
| 6,580,258 | B2 | 6/2003 | Wilcox et al. |
| 6,724,174 | B1 | 4/2004 | Esteves et al. |
| 7,245,113 | B2 | 7/2007 | Chen et al. |
| 2006/0097705 | A1 * | 5/2006 | Cheung et al. ......... 323/222 |
| 2006/0273772 | A1 * | 12/2006 | Groom ......... 323/284 |

OTHER PUBLICATIONS

Low-Voltage, Step-Down DC-DC Converters in SOT23.
1.5MHz, 600mA Synchronous Step-Down Regulator in ThinSOT.
Monolithic 1A Step-Down Regulator with Low Quiescent Current.
500mA 2MHz Synchronous Step-Up DC/DC Converters in 2mm x 2mm DFN.

* cited by examiner

*Primary Examiner* — Nguyen Tran
(74) *Attorney, Agent, or Firm* — Winston Hsu; Scott Margo (57) ABSTRACT

A control circuit comprises a PWM control circuit and a PWM skip control circuit. The PWM control circuit controls a switching circuit. The switching circuit acts as a current source for an output circuit and a load circuit. The PWM skip control circuit controls the operation of the PWM control circuit. When the output current of the switching circuit is below a predetermined threshold, the PWM skip control circuit stops the operation of the PWM control circuit. When the output voltage of the switching circuit is below a predetermined threshold, the PWM skip control circuit resumes the operation of the PWM control circuit.

5 Claims, 7 Drawing Sheets

SWITCHING VOLTAGE REGULATOR, CONTROL CIRCUIT AND METHOD THEREOF

BACKGROUND OF THE INVENTION

1. Field of the Invention

The present invention relates to a switching voltage regulator, and more particularly, to a switching voltage regulator with circuit improving efficiency under light load condition.

2. Description of the Related Art

A voltage regulator serves the function of transforming an input voltage to a regulated output voltage. A voltage regulator typically can be categorized as a linear voltage regulator or a switching voltage regulator. A linear voltage regulator utilizes passive components, such as variable resistors, to provide a continuous current from the input terminal to the output terminal. A switching voltage regulator, on the other hand, utilizes a pair of switches connected in series, activated interchangeably, to provide a current to the output terminal.

Because the power efficiency of the linear voltage regulator is generally below 65%, this architecture is not suitable for the hand-held devices, mainly powered from battery. Therefore, the power supply apparatus in mobile electronic devices such as notebook computers or cellular phones is mainly implemented by switching voltage regulators.

Figure 1:
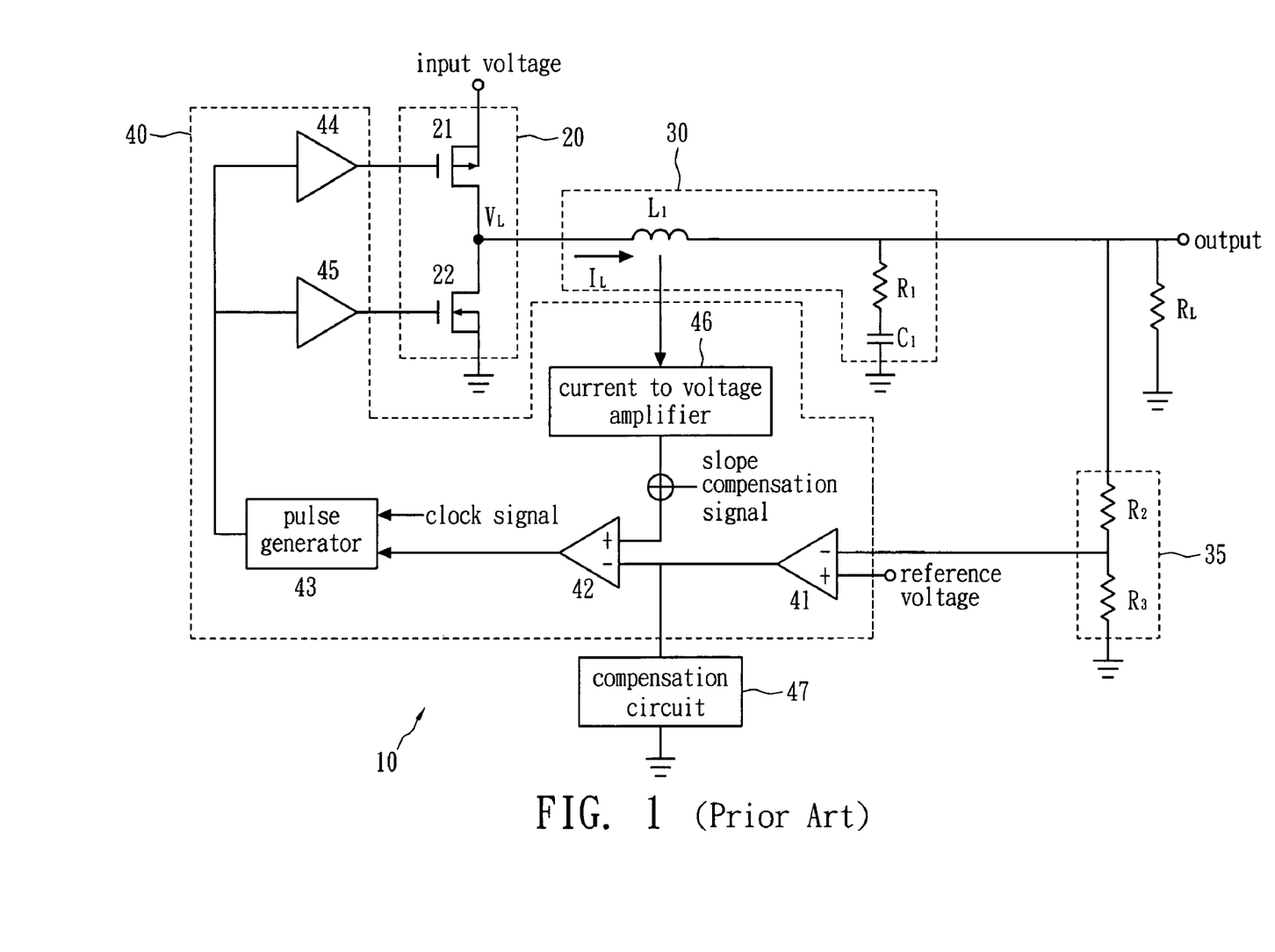
FIG. 1 shows a conventional switching voltage regulator.

FIG. 1 shows a conventional switching voltage regulator. The switching voltage regulator 10 comprises a switching circuit 20, an output circuit 30, a feedback circuit 35, a pulse width modulation (PWM) control circuit 40 and a compensation circuit 47. The switching circuit 20 comprises a PMOS high side transistor 21 and a low side NMOS transistor 22. The source electrode of the high side transistor 21 is connected to an input voltage. The source electrode of the low side transistor 22 is grounded. The drain electrode of the low side transistor 22 is connected to the drain electrode of the high side transistor 21. The output circuit 30 comprises an inductor L1, a capacitor C1 and a parasitical resistor R1. The inductor L1, the capacitor C1 and the parasitical resistor R1 form a low pass filter, transforming the output current $I_L$ of the switching circuit 20 into a regulated voltage across a load circuit $R_L$. The feedback circuit 35 comprises resistors R2 and R3. The PWM control circuit 40 comprises an error amplifier 41, a PWM comparator 42, a pulse generator 43, a high side driver 44, a low side driver 45 and a current-to-voltage amplifier 46. The resistor R1 is connected to the output terminal of the switching voltage regulator 10. The resistor R2 connects the resistor R1 to ground. The input terminals of the error amplifier 41 are connected to a reference voltage and the common node of the resistors R2 and R3, respectively. The negative input terminal of the PWM comparator 42 is connected to the output terminal of the error amplifier 41 and the compensation circuit 47. The positive input terminal of the PWM comparator 42 receives the sum of the output terminal of the current-to-voltage amplifier 46 and a slope compensation signal. The input terminals of the pulse generator 43 are connected to the output terminal of the PWM comparator 42 and a clock signal. The input terminals of the high side driver 44 and the low side driver 45 are both connected to the output terminal of the pulse generator 43. The output terminals of the high side driver 44 and the low side driver 45 are connected to the gate electrodes of the high side transistor 21 and the low side transistor 22, respectively. The current-to-voltage amplifier 46 transforms the current flowing through the inductor L1 into a voltage signal.

The error amplifier 41 regulates the output voltage of the switching voltage regulator 10 by connecting the reference voltage to its non-inverting terminal and the divided voltage of the output voltage of the switching voltage regulator 10 to its inverting terminal.

When in a normal mode, the output voltage of the pulse generator 43 is low at the beginning of each cycle of the clock signal. The high side driver 44 activates the high side transistor 21. The low side driver 45 deactivates the low side transistor 22. The output voltage $V_L$ of the switching circuit 20 equals to the input voltage, while the output current $I_L$ of the switching circuit 20 is increasing. When the output current $I_L$ exceeds a threshold such that the sum of the transformed voltage of the current-to-voltage amplifier 46 and the slope compensation signal is greater than the output voltage of the error amplifier 41, the pulse generator 43 outputs a pulse signal of a fixed duration. The high side driver 44 deactivates the high side transistor 21. The low side driver 45 activates the low side transistor 22. The output current $I_L$ starts to drop. When the next cycle of the clock signal resets the output voltage of the pulse generator to low, the high side transistor 21 is reactivated, and the low side transistor 22 is deactivated.

Figure 2:
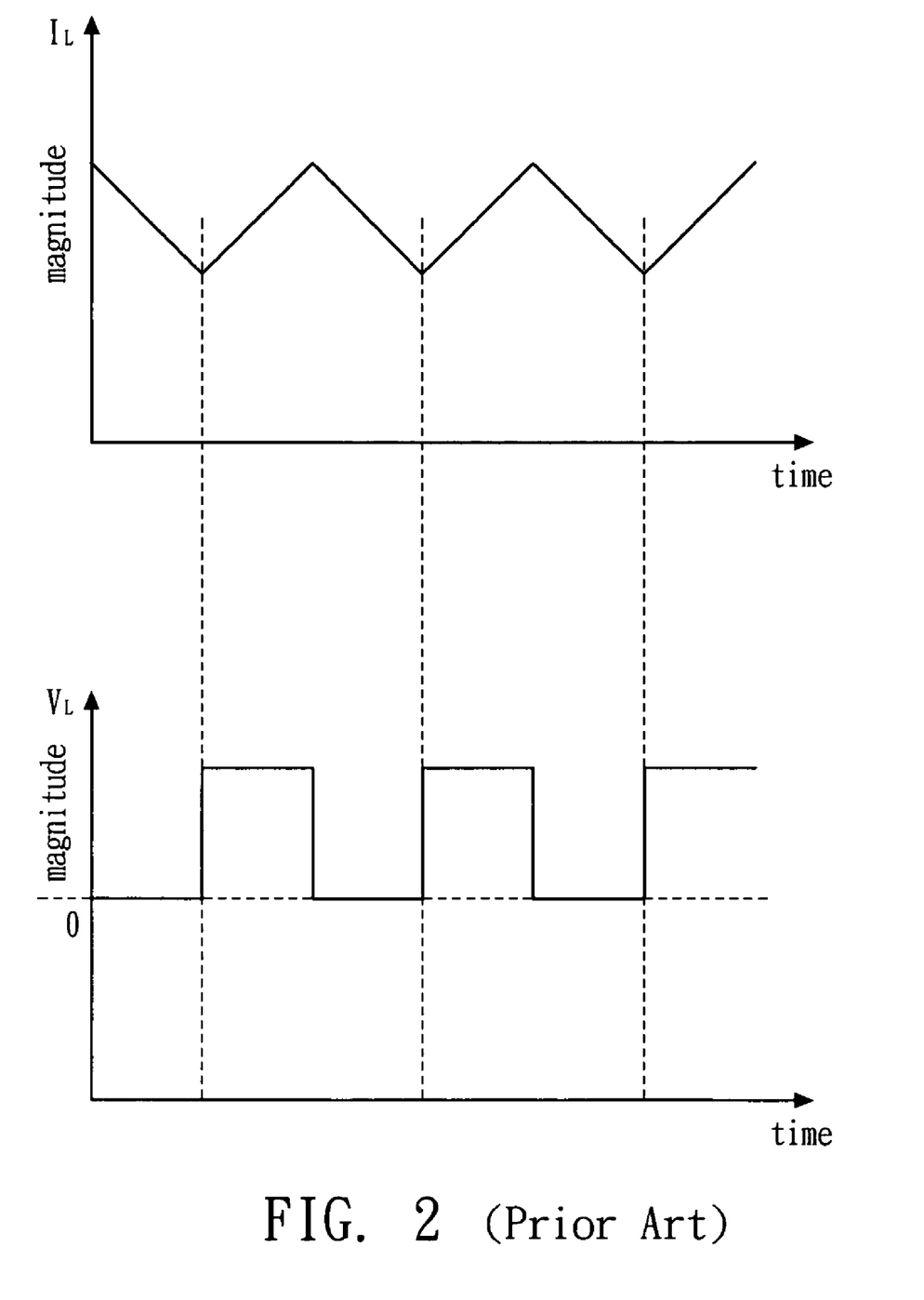
FIG. 2 shows the waveforms of the output voltage and the output current of a conventional switching voltage regulator.

FIG. 2 shows the waveforms of the output voltage $V_L$ and the output current $I_L$ of the switching voltage regulator 10. As shown in FIG. 2, the waveform of the output voltage $V_L$ is a square wave, and the waveform of the output current $I_L$ is a triangular wave.

When the load circuit $R_L$ becomes large, i.e., when the DC level of the output current $I_L$ of the switching voltage regulator 10 is low, the power efficiency of the switching voltage regulator 10 declines due to the switch loss. Moreover, when the output current $I_L$ of the switching voltage regulator 10 drops below zero ampere, the switching voltage regulator 10 drains power from the load circuit $R_L$. Therefore, there is a need to design a switching voltage regulator that can maintain high power efficiency as it operates under the light load condition.

SUMMARY OF THE INVENTION

The proposed control circuit for a switching circuit according to one embodiment of the present invention includes a PWM control circuit and a PWM skip control circuit, wherein the switching circuit comprises a high side transistor and a low side transistor and is connected to an output circuit. The PWM control circuit is configured to control the switching circuit to output a current in PWM manner. The PWM skip control circuit is configured to control the PWM control circuit. When the successive number of times at which the output current of the switching circuit is below a predetermined threshold exceeds a predetermined number, the PWM skip control circuit stops the operation of the PWM control circuit. When a divided voltage of the output voltage of the output circuit is below a predetermined falling threshold, the PWM skip control circuit resumes the operation of the PWM control circuit.

The control circuit for a switching circuit according to another embodiment of the present invention comprises a PWM logic circuit, a PWM comparator, an error amplifier, a voltage matching circuit, a pulse stop logic circuit, a light load comparator and a zero current comparator, wherein the switching circuit comprises a high side transistor and a low side transistor and is connected to an output circuit. The PWM logic circuit is configured to generate a control signal to the switching circuit to output a current in PWM manner. The PWM comparator is configured to generate the input signal of the PWM logic circuit. The error amplifier is configured to amplify and output the voltage difference between the divided voltage of the output voltage of the output circuit and a first reference voltage to the PWM comparator. The voltage matching circuit is configured to generate and output a voltage mapping to the output current of the switching circuit to the PWM comparator. The pulse stop logic circuit is configured to generate a signal to stop the operation of the PWM logic circuit. The light load comparator is configured to detect the voltage difference between the divided voltage of the output voltage of the output circuit and a second reference voltage and to control the pulse stop logic circuit. The zero current comparator is configured to detect the current flowing through the low side transistor and to output a zero current signal to the pulse stop logic circuit. The pulse stop logic circuit determines whether to stop or resume the operation of the PWM logic circuit according to the output signals of the light load comparator and the zero current comparator.

The method for controlling a switching voltage regulator comprising a switching circuit that includes a high side transistor and a low side transistor according to yet another embodiment of the present invention comprises the steps of: activating the high side transistor and deactivating the low side transistor; if the output current of the switching circuit exceeds a threshold, deactivating the high side transistor and activating the low side transistor; if the current flowing through the low side transistor drops below zero ampere, deactivating both the high side transistor and the low side transistor; and if the output voltage of the switching voltage regulator drops below a predetermined threshold, activating the high side transistor and deactivating the low side transistor.

BRIEF DESCRIPTION OF THE DRAWINGS

The objectives and advantages of the present invention will become apparent upon reading the following description and upon referring to the accompanying drawings of which.

DETAILED DESCRIPTION OF THE INVENTION

Figure 3:
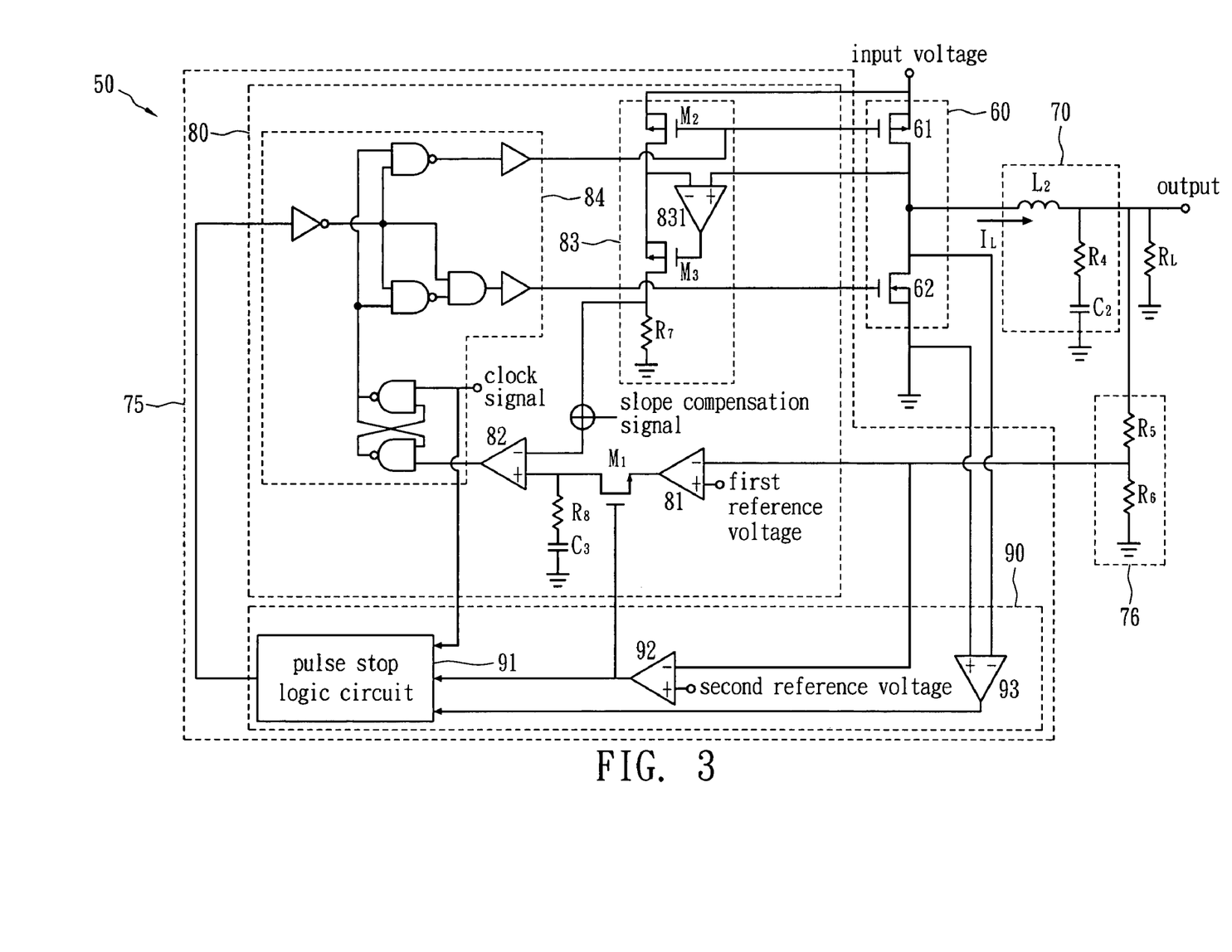
FIG. 3 shows a block diagram of a switching voltage regulator according to one embodiment of the present invention.

FIG. 3 shows a block diagram of a switching voltage regulator and the control circuit thereof according to one embodiment of the present invention. The switching voltage regulator 50 comprises a switching circuit 60, an output circuit 70, a control circuit 75 and a feedback circuit 76. The control circuit 75 comprises a PWM control circuit 80 and a PWM skip control circuit 90. The feedback circuit 76 comprises a resistor R5 and R6. The switching circuit 60 comprises a high side transistor 61 and a low side transistor 62. The source electrode of the high side transistor 61 is connected to an input voltage. The source electrode of the low side transistor 62 is grounded. The drain electrode of the low side transistor 62 is connected to the drain electrode of the high side transistor 61. The output circuit 70 comprises an inductor L2, a capacitor C2 and a parasite resistor R4 serially connected to the capacitor C2. The inductor L2, the capacitor C2 and the parasite resistor R4 form a low pass filter, which receives and regulates the pulse-shaped output voltage of the switching circuit 60 into a DC voltage to output to the load circuit $R_L$ of the switching voltage regulator 50.

The PWM control circuit 80 comprises an error amplifier 81, a PWM comparator 82, a voltage matching circuit 83 and a PWM logic circuit 84. The resistor R5 is connected to the output terminal of the output circuit 70. The resistor R6 connects the resistor R5 to ground. The input terminals of the error amplifier 81 are connected to the common node of the resistors R5 and R6 and a first reference voltage, respectively. The output terminal of the error amplifier 81 is connected to one input terminal of the PWM comparator 82 via a switch M1, and grounded via a resistor R8 and a capacitor C3. The other input terminal of the PWM comparator 82 is connected to the output terminal of the voltage matching circuit 83. The input terminals of the PWM logic circuit 84 are connected to the output terminal of the PWM comparator 82 and a clock signal. The output terminals of the PWM logic circuit 84 are connected to the switching circuit 60. The voltage matching circuit 83 comprises a first sense transistor M2, a second sense transistor M3, a sense amplifier 831 and a sense resistor R7. The gate electrode of the first sense transistor M2 is connected to the gate electrode of the high side transistor 61. The source electrode of the first sense transistor M2 is connected to the source electrode of the high side transistor 61. The drain electrode of the second sense transistor M3 is connected to the drain electrode of the first sense transistor M2. The input terminals of the sense amplifier 831 are connected to the drain electrode of the first sense transistor M2 and to the drain electrode of the high side transistor 61, respectively. The output terminal of the sense amplifier is connected to the gate electrode of the second sense transistor M3. The source electrode of the second sense transistor M3 is grounded via the sense resistor R7.

The PWM skip control circuit 90 comprises a pulse stop logic circuit 91, a light load comparator 92 and a zero current comparator 93. The output terminal of the pulse stop logic circuit 91 is connected to the PWM control circuit 80. The input terminals of the light load comparator 92 are connected to the common node of the resistors R5 and R6 and a second reference voltage, respectively. The output terminal of the light load comparator 92 is connected to the pulse stop logic circuit 91. The positive and negative input terminals of the zero current comparator 93 are connected to the source electrode and the drain electrode of the low side transistor 62, respectively. The output terminal of the zero current comparator 93 is connected to the pulse stop logic circuit 91.

The non-inverting input terminal of the error amplifier 81 is connected to the first reference voltage. The inverting input terminal of the error amplifier 81 is connected to the divided voltage of the output voltage of the output circuit 70; it forms a feedback loop such that the divided voltage of the output voltage of the output circuit 70 is substantially the same as the first reference voltage. Therefore, the output voltage of the output circuit 70 is regulated at the desired voltage level.

The sense amplifier 831 controls the current flowing through the first sense transistor M2, such that the ratio of the current flowing through the first sense transistor M2 to the current flowing through the high side transistor 61 is substantially equal to the ratio of the size of the first sense transistor M2 to the size of the high side transistor 61. The resistance of the sense resistor R7 is configured such that the voltage at the source electrode of the second sense transistor M3 is substantially the same as the output voltage of the switching circuit 60. The voltage matching circuit 83 generates and outputs a voltage matching the output voltage of the switching circuit 60. The first sense transistor M2 matches the high side transistor 61. The second sense transistor M3 generates the current flowing through the first sense transistor M2. Preferably, the first sense transistor M2 and the high side transistor 61 are the same type of transistor. The second sense transistor M3 can be any type of transistor.

When in normal mode, the output voltage of the PWM logic circuit 84 is low at the beginning of each cycle of the clock signal. The high side transistor 61 is activated, and the low side transistor 62 is non-activated. The output voltage of the switching circuit 60 equals to the input voltage, and the output current $I_L$ of the switching circuit 60 is increasing. When the output current $I_L$ exceeds a threshold such that the sum of the output voltage of the voltage matching circuit 83 and a slope compensation signal is greater than the output voltage of the error amplifier 81, the PWM comparator 82 sends a signal to the PWM logic circuit 84. The PWM logic circuit 84 then outputs high voltage to deactivate the high side transistor 61 and activate the low side transistor 62. When the next clock cycle triggers, the PWM logic circuit 84 resumes normal mode, the high side transistor 61 is reactivated, and the low side transistor 62 is deactivated.

When the load circuit $R_L$ becomes large, i.e., when the DC level of the output current $I_L$ of the switching voltage regulator 60 is low, the output circuit 70 of the embodiment provides a mechanism to stop the operation of the PWM control circuit 80 such that the number of times that switching circuit 60 switches is decreased, and the energy loss caused by the switching is reduced.

When the low side transistor 62 is activated, the zero current comparator 93 detects the current flowing through the low side transistor. If the detected current is negative, i.e., the switching circuit 60 drains energy from the load circuit $R_L$, the zero current comparator 93 outputs a signal to the pulse stop logic circuit 91. The pulse stop logic circuit 91 starts to counts the sending of the signal. If during specific periods of the clock signal, the successive number of times at which the zero current comparator 93 outputs the signal exceeds a predetermined number, the PWM skip control circuit 91 stops the operation of the PWM control circuit 80, and the switch M1 is deactivated to store the output voltage of the error amplifier 81 on the capacitor C3. At such time, the output current of the output circuit 70 is zero ampere. The load circuit $R_L$ receives energy from the capacitor C2. When the output voltage of the output circuit 70 drops below a predetermined threshold, such that the divided voltage of the output voltage of the output circuit 70 is below the second reference voltage, the light load comparator 92 activates the switch M1, and the operation of the PWM control circuit 80 is resumed.

Figure 4:
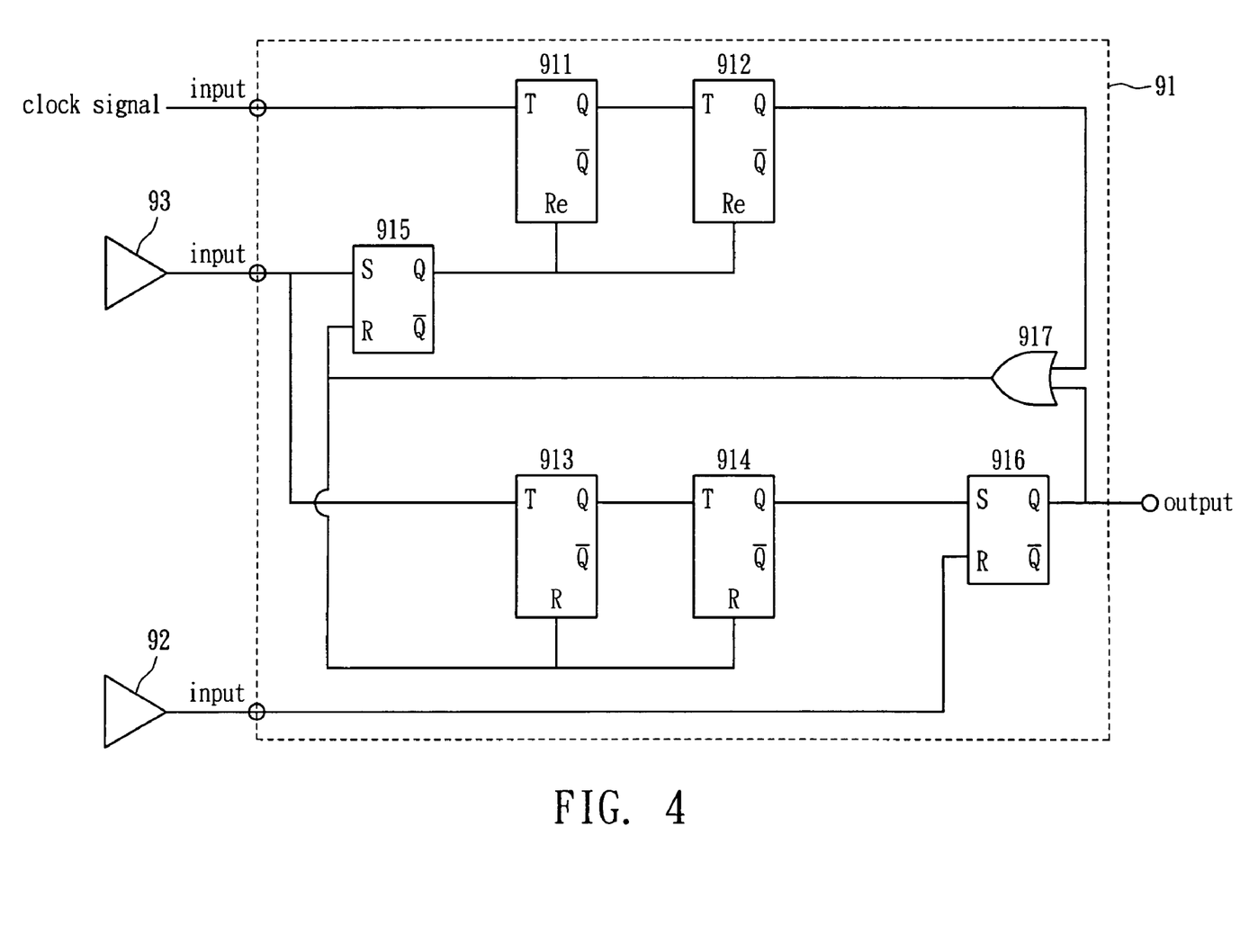
FIG. 4 shows a block diagram of a pulse stop logic circuit according to one embodiment of the present invention.

FIG. 4 shows a block diagram of the pulse stop logic circuit 91. The pulse stop logic circuit 91 comprises T flip-flops 911 to 914, S-R latches 915 and 916 and an OR gate 917. The flip-flops 911 and 912 form a counter to count the period of the clock signal. The flip-flops 913 and 914 form a counter to count the output of the zero current comparator 93. The counter formed by the flip-flops 911 and 912 sends a reset signal to reset the flip-flops 911 to 914 after two period of the clock signal. If the counter formed by the flip-flops 913 and 914 counts two successive signals from the zero current comparator 93 before the counter formed by the flip-flops 911 and 912 sends the reset signal, the flip-flop 914 sends a signal to the latch 916 to stop the operation of the PWM control circuit 80, and the flip-flops 911 to 914 are reset. When the latch 916 receives the signal from the light load comparator 92, the operation of the PWM control circuit 80 is resumed, and the flip-flops 911 to 914 are reset.

The pulse stop logic circuit 91 in FIG. 4 utilizes the flip-flops 911 to 914 to count the successive number of times at which the output current of the switching circuit 60 becomes negative. When said event occurs two successive times, the operation of the PWM control circuit 80 is stopped. However, the number of the flip-flops in the present invention has no limitation, and neither does the number of times that the output current of the switching circuit 60 can become negative.

Figure 5:
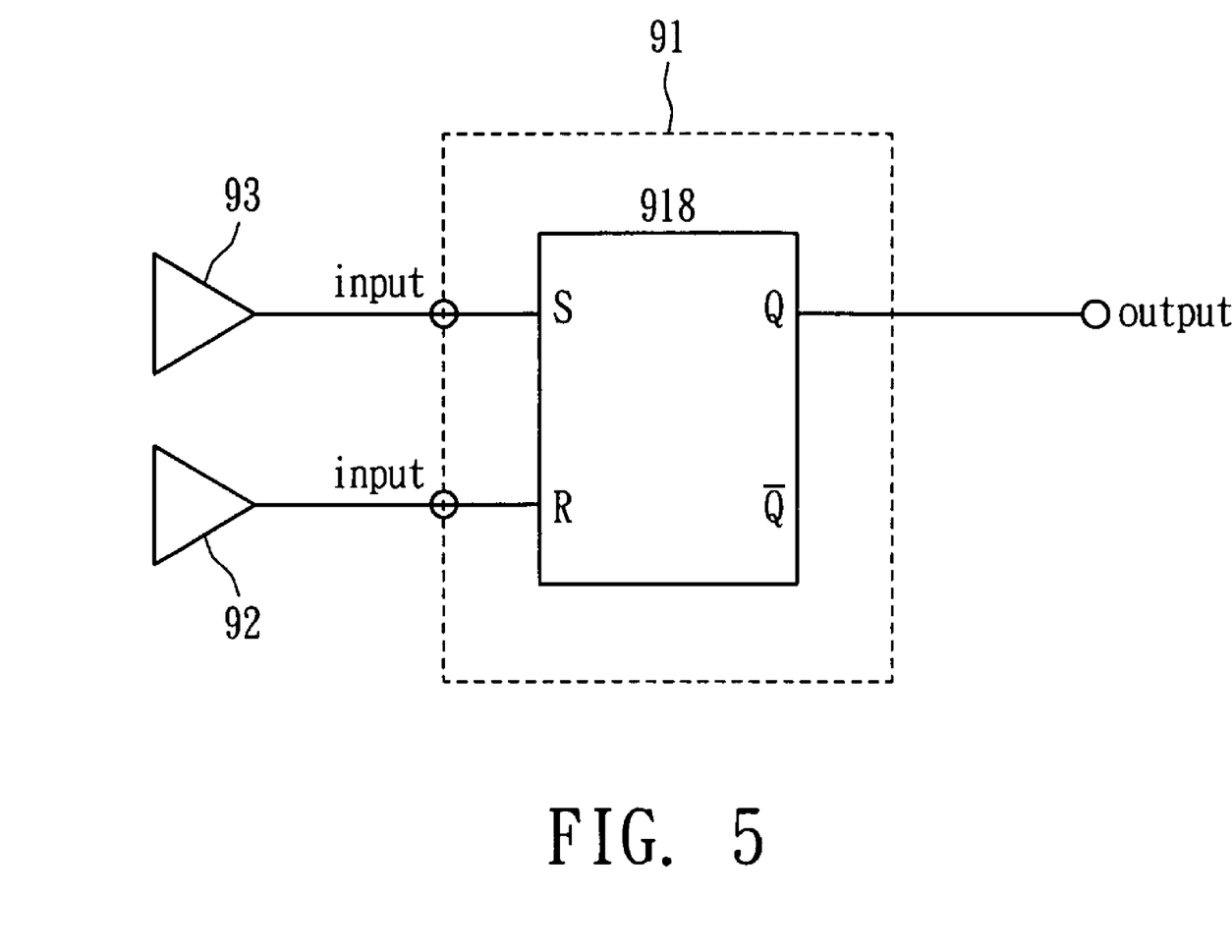
FIG. 5 shows an alternative block diagram of a pulse stop logic circuit according to one embodiment of the present invention.

FIG. 5 shows an alternative block diagram of the pulse stop logic circuit 91. The pulse stop logic circuit 91 comprises a S-R latch 918. As shown in FIG. 5, the pulse stop logic circuit 91 stops the operation of the PWM control circuit 80 when the zero current comparator 93 detects that the output current of the switching circuit 60 becomes negative. When the output voltage of the output circuit 70 drops below a predetermined threshold, the operation of the PWM control circuit 80 is resumed.

Figure 6:
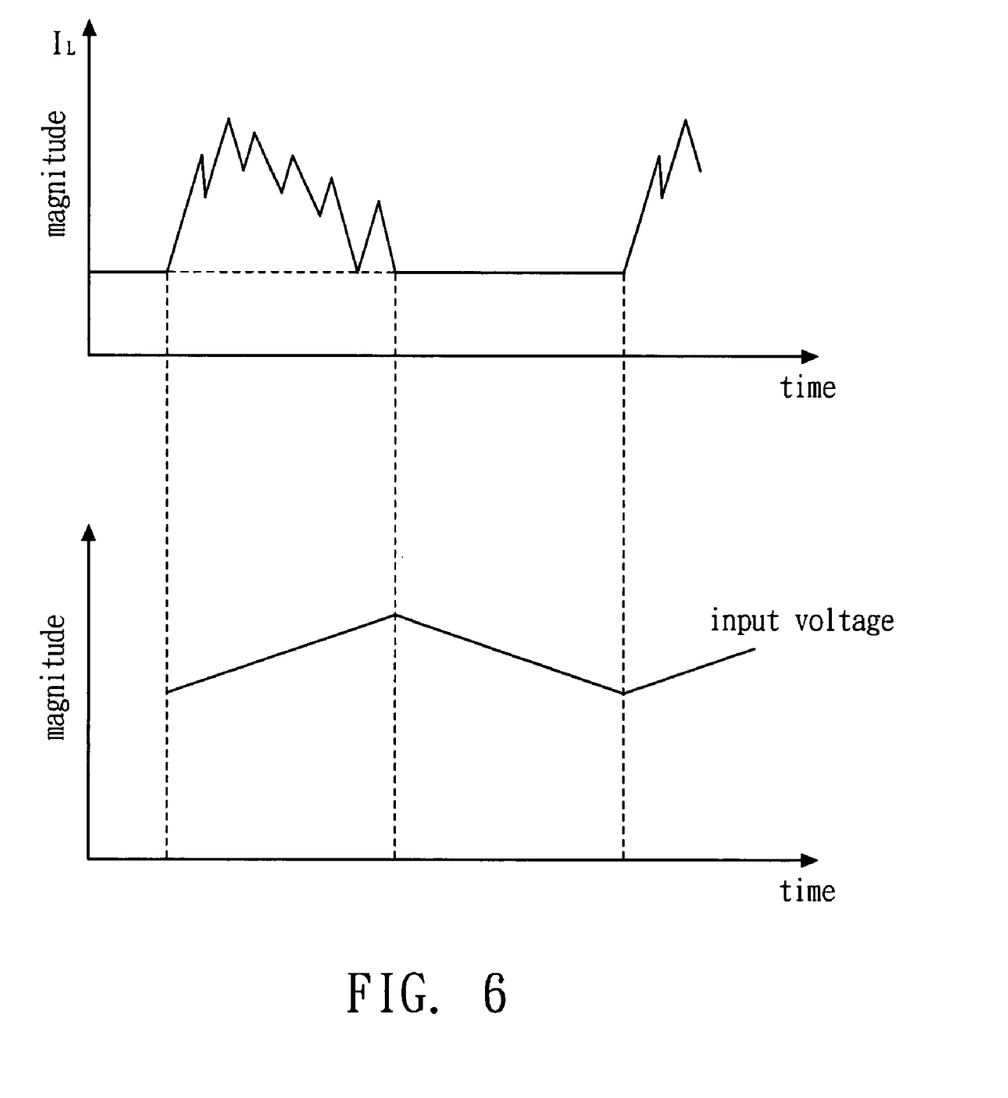
FIG. 6 shows the waveforms of the output voltage of a switching voltage regulator and the output current of a switching circuit when the load circuit is a light load according to one embodiment of the present invention.

FIG. 6 shows the waveforms of the output voltage $V_L$ of the output circuit 70 and the output current $I_L$ of the switching circuit 60 when the load circuit $R_L$ is a light load. As shown in FIG. 6, when the event whereby the output current of the switching circuit 60 becomes negative occurs two times in a row, the pulse stop logic circuit 91 stops the operation of the PWM control circuit 80. In consequence, both the high-side switch 61 and the low-side switch 62 are deactivated. When the output voltage of the output circuit 70 drops below a threshold, the operation of the PWM control circuit 80 is resumed.

Figure 7:
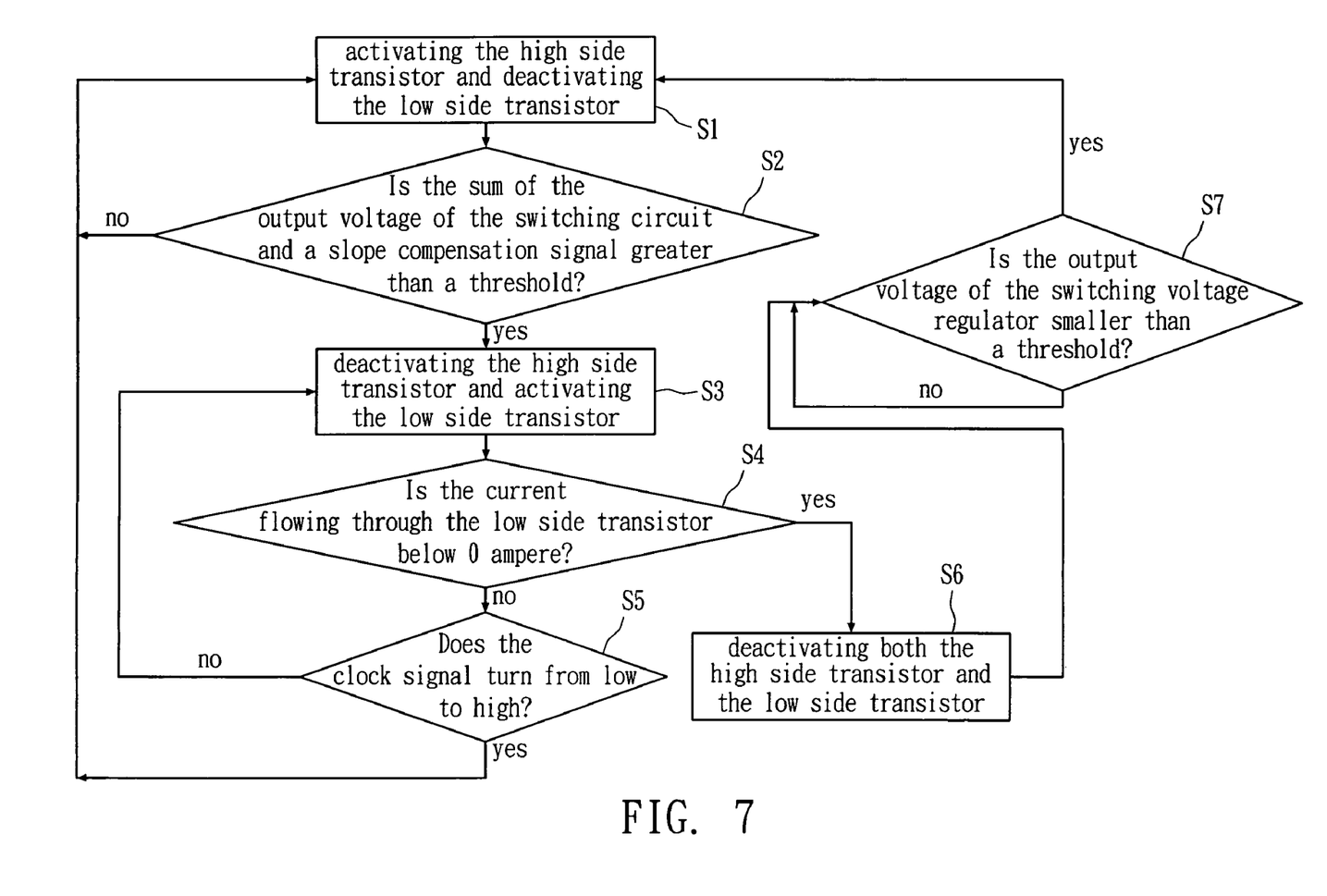
FIG. 7 shows a flow chart of the method to control a switching voltage regulator according to one embodiment of the present invention.

FIG. 7 shows a flow chart of the method for controlling a switching voltage regulator according to one embodiment of the present invention, wherein the switching voltage regulator utilizes a switching circuit, which comprises a high side transistor and a low side transistor, to regulate an input voltage into an output voltage. In step S1, the high side transistor is activated, and the low side transistor is deactivated. In step S2, the output current of the switching circuit is checked to determine whether it is greater than a threshold, i.e., the sum of the output voltage of the switching circuit and a slope compensation signal is compared with a predetermined threshold. If so, step S3 is executed; otherwise, step S1 is repeated. In step S3, the high side transistor is deactivated, and the low side transistor is activated. In step S4, the current flowing through the low side transistor is detected to determine whether it is below zero ampere. If so, step S6 is executed; otherwise, step S5 is executed. In step S5, a clock signal is checked to determine whether it is turning from low to high. If so, step S1 is repeated; otherwise, step S3 is repeated. In step S6, the high side transistor and the low side transistor are both deactivated. In step S7, the output voltage of the switching voltage regulator is checked to determine whether it is below a threshold. If so, step S1 is repeated; otherwise, step S6 is repeated.

For the decision procedure in step S4, it can be configured that once the current flowing through the low side transistor is below zero ampere, step S6 is executed, or that until the current flowing through the low side transistor is below zero ampere a predetermined number of times in a row, such as two times, step S6 is executed.

The above-described embodiments of the present invention are intended to be illustrative only. Those skilled in the art may devise numerous alternative embodiments without departing from the scope of the following claims.

What is claimed is:

1. A control circuit applied to a switching circuit comprising a high side transistor and a low side transistor, the switching circuit being connected to an output circuit, the control circuit comprising:
   a pulse width modulation (PWM) logic circuit configured to generate a control signal to the switching circuit to output a current in a PWM manner;
   a PWM comparator configured to generate an input signal of the PWM logic circuit;
   an error amplifier configured to amplify and output the voltage difference between the divided voltage of the output voltage of the output circuit and a first reference voltage to the PWM comparator;
   a voltage matching circuit configured to generate and output a voltage mapping to the output current of the switching circuit to the PWM comparator;
   a pulse stop logic circuit configured to generate a signal to stop the operation of the PWM logic circuit;
   a light load comparator configured to detect the voltage difference between the divided voltage of the output voltage of the output circuit and a second reference voltage and to control the pulse stop logic circuit; and
   a zero current comparator configured to detect the current flowing through the low side transistor and to output a zero current signal to the pulse stop logic circuit;
   wherein the pulse stop logic circuit determines whether to stop or resume the operation of the PWM logic circuit according to the output signals of the light load comparator and the zero current comparator;
   wherein when a clock signal changes state from low to high, the PWM logic circuit activates the high side transistor and deactivates the low side transistor; and
   when the amplified signal of the voltage difference between the divided voltage of the output voltage of the output circuit and a first reference voltage is smaller than the sum of the output voltage of the switching circuit and a slope compensation signal, the PWM logic circuit deactivates the high side transistor and activates the low side transistor.

2. The control circuit of claim 1, wherein when the light load comparator detects that the divided voltage of the output voltage of the output circuit drops below the second reference voltage, the pulse stop logic circuit resumes the operation of the PWM logic circuit.

3. A control circuit applied to a switching circuit comprising a high side transistor and a low side transistor, the switching circuit being connected to an output circuit, the control circuit comprising:
   a pulse width modulation (PWM) logic circuit configured to generate a control signal to the switching circuit to output a current in a PWM manner;
   a PWM comparator configured to generate an input signal of the PWM logic circuit;
   an error amplifier configured to amplify and output the voltage difference between the divided voltage of the output voltage of the output circuit and a first reference voltage to the PWM comparator, wherein the output terminal of the error amplifier is connected to an input terminal of the PWM comparator via a switch, and the input terminal is grounded via a capacitor;
   a voltage matching circuit configured to generate and output a voltage mapping to the output current of the switching circuit to the PWM comparator;
   a pulse stop logic circuit configured to generate a signal to stop the operation of the PWM logic circuit;
   a light load comparator configured to detect the voltage difference between the divided voltage of the output voltage of the output circuit and a second reference voltage and to control the pulse stop logic circuit; and
   a zero current comparator configured to detect the current flowing through the low side transistor and to output a zero current signal to the pulse stop logic circuit;
   wherein the pulse stop logic circuit determines whether to stop or resume the operation of the PWM logic circuit according to the output signals of the light load comparator and the zero current comparator;
   wherein when operation of the PWM logic circuit is stopped by the pulse stop logic circuit, the pulse stop logic circuit deactivates the switch such that the output voltage of the error amplifier is stored on the capacitor; and when the operation of the PWM logic circuit is resumed, the switch is reactivated.

4. A control circuit applied to a switching circuit comprising a high side transistor and a low side transistor, the switching circuit being connected to an output circuit, the control circuit comprising:
   a pulse width modulation (PWM) logic circuit configured to generate a control signal to the switching circuit to output a current in a PWM manner;
   a PWM comparator configured to generate an input signal of the PWM logic circuit;
   an error amplifier configured to amplify and output the voltage difference between the divided voltage of the output voltage of the output circuit and a first reference voltage to the PWM comparator;
   a voltage matching circuit configured to generate and output a voltage mapping to the output current of the switching circuit to the PWM comparator, wherein the voltage matching circuit comprises:
     a first sense transistor having a gate electrode connected to the gate electrode of the high side transistor, and having a current input terminal connected to a current input terminal of the high side transistor;
     a second sense transistor with the current input terminal connected to a current output terminal of the first sense transistor;
     a sense amplifier having an input terminal connected to a current output terminal of the first sense transistor, having the other input terminal connected to the current output terminal of the high side transistor, and having an output terminal connected to the gate electrode of the second sense transistor; and
     a sense resistor connecting the current output terminal of the second sense transistor to ground;
     wherein the sense amplifier is configured to control the current flowing through the first sense transistor such that the ratio of the current flowing through the first sense transistor to the current flowing through the high side transistor is substantially equal to the size ratio of the first sense transistor to the high side transistor;
     wherein the resistance of the sense resistor is configured such that the voltage at the current output terminal of the second sense transistor is substantially equal to the output voltage of the switching circuit;
   a pulse stop logic circuit configured to generate a signal to stop the operation of the PWM logic circuit;
   a light load comparator configured to detect the voltage difference between the divided voltage of the output voltage of the output circuit and a second reference voltage and to control the pulse stop logic circuit; and
   a zero current comparator configured to detect the current flowing through the low side transistor and to output a zero current signal to the pulse stop logic circuit;

wherein the pulse stop logic circuit determines whether to stop or resume the operation of the PWM logic circuit according to the output signals of the light load comparator and the zero current comparator.

5. A control circuit applied to a switching circuit comprising a high side transistor and a low side transistor, the switching circuit being connected to an output circuit, the control circuit comprising:

a pulse width modulation (PWM) logic circuit configured to generate a control signal to the switching circuit to output a current in a PWM manner;

a PWM comparator configured to generate an input signal of the PWM logic circuit;

an error amplifier configured to amplify and output the voltage difference between the divided voltage of the output voltage of the output circuit and a first reference voltage to the PWM comparator;

a voltage matching circuit configured to generate and output a voltage mapping to the output current of the switching circuit to the PWM comparator;

a pulse stop logic circuit configured to generate a signal to stop the operation of the PWM logic circuit;

a light load comparator configured to detect the voltage difference between the divided voltage of the output voltage of the output circuit and a second reference voltage and to control the pulse stop logic circuit; and a zero current comparator configured to detect the current flowing through the low side transistor and to output a zero current signal to the pulse stop logic circuit;

wherein the pulse stop logic circuit determines whether to stop or resume the operation of the PWM logic circuit according to the output signals of the light load comparator and the zero current comparator;

wherein when the zero current comparator detects that the successive number of times at which the output current of the switching circuit drops below zero ampere twice in a row, the pulse stop logic circuit stops the operation of the PWM logic circuit.

* * * * *